United States Patent [19]

Tsuchiya et al.

[11] 4,444,737

[45] Apr. 24, 1984

[54] PROCESS FOR SEPARATING AND RECOVERING HYDROGEN ISOTOPE

[75] Inventors: Hiroyuki Tsuchiya; Yamato Asakura; Teiji Suzuki; Makoto Kikuchi, all of Hitachi, Japan

[73] Assignee: Hitachi, Ltd., Tokyo, Japan

[21] Appl. No.: 251,765

[22] Filed: Apr. 7, 1981

[30] Foreign Application Priority Data

Apr. 7, 1980 [JP] Japan .................................. 55-44719

[51] Int. Cl.³ .............................................. B01D 59/33
[52] U.S. Cl. .................................... 423/249; 423/580; 423/648 A
[58] Field of Search ..................... 423/648 A, 580, 249

[56] References Cited

U.S. PATENT DOCUMENTS 4,217,332  8/1980  Hindin et al. .................... 423/648 A

FOREIGN PATENT DOCUMENTS 53-54697  5/1978  Japan .

Primary Examiner—Deborah L. Kyle
Attorney, Agent, or Firm—Antonelli, Terry & Wands

[57] ABSTRACT

Hydrogen isotope is separated and recovered with remarkable reduction in energy consumption in a compact apparatus using a cold reactor and a hot reactor based on dual temperature process by a combination of a first step of at least one isotope exchange reaction stage comprising contacting mists of a feed liquid cocurrently together with a reacting gas with an isotope exchange reaction catalyst at a low temperature, and a second step of a plurality of stages each comprising a gas-liquid contact of the liquid from the first step with vapor of the liquid and the reacting gas and an isotope exchange reaction between the vapor of the liquid and the reacting gas at a high temperature.

12 Claims, 5 Drawing Figures

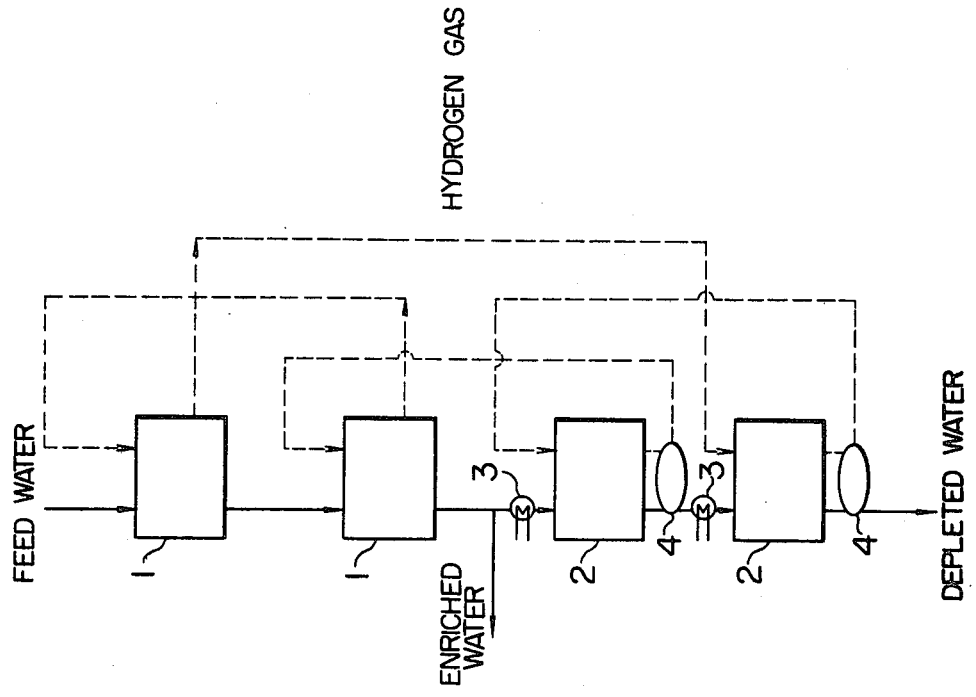
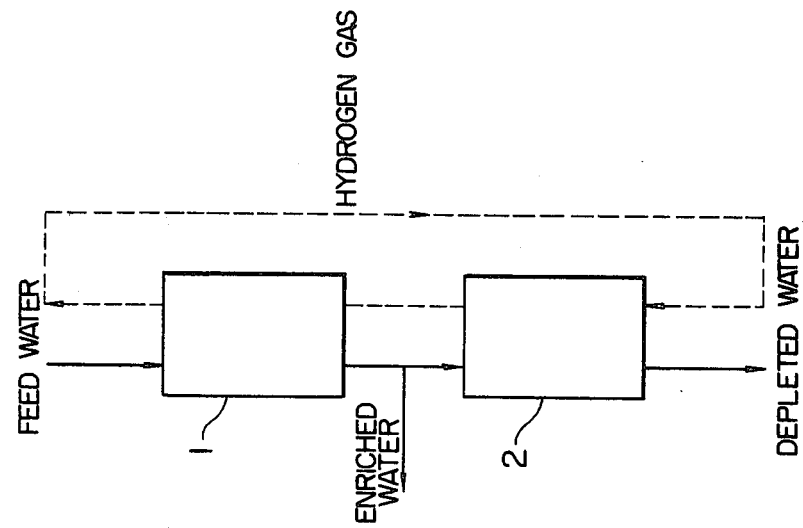

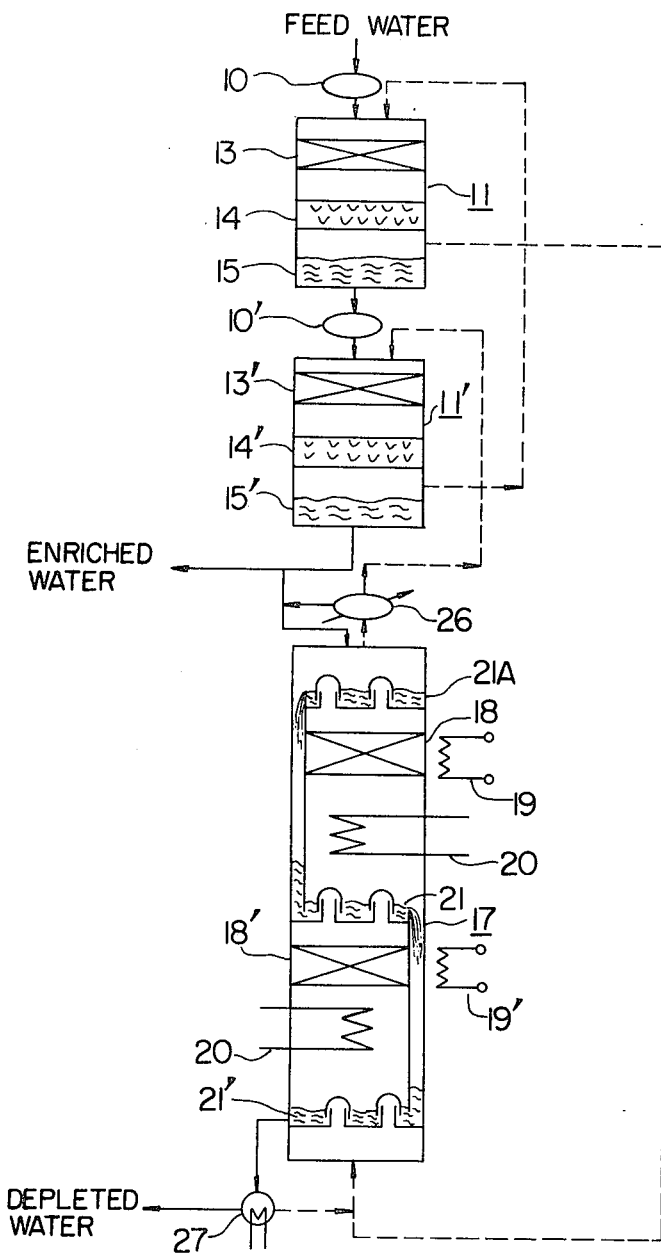

PROCESS FOR SEPARATING AND RECOVERING HYDROGEN ISOTOPE

BACKGROUNDS OF THE INVENTION

The present invention relates to a process for separating and recovering isotopes, and particularly to a process for separating and recovering hydrogen isotopes suitable for energetically and efficiently removing and enriching hydrogen isotope from liquid water.

A temperature exchange process is available as one of the processes for separating hydrogen isotopes such as deuterium (D) and tritium (T), and the process principally utilizes isotope exchange reactions between the hydrogen compounds. That is, the reactions utilize such an isotope effect that, for example, when water and hydrogen sulfide gas, each at the same deuterium concentration, are mixed together, the deuterium concentration of the water will become higher than that of the hydrogen sulfide gas in the equilibrium state.

For separating and enriching hydrogen isotopes with higher efficiency, a combination of two temperature exchange reactors, the one at a low temperature and the other at a high temperature, i.e. dual temperature process, is used. The exchange reactions to be utilized in the dual temperature process include exchange reactions between water and hydrogen sulfide gas, between water and hydrogen gas, between water and hydrogen bromide, and between ammonia and hydrogen, but the exchange reactions between water and hydrogen sulfide gas and between water and hydrogen gas are regarded as commercially important. The exchange reaction between water and hydrogen sulfide gas has such an advantage that the exchange reaction rate is high enough to avoid the necessity use of a catalyst in the reaction, but has such a disadvantage that the separation coefficient depending upon the chemical equilibrium is small. On the other hand, the exchange reaction between water and hydrogen gas has a large separation coefficient, but a low exchange reaction rate, and thus necessitates use of a catalyst for promoting reaction [Benedict, Pigford: Nuclear Chemical Engineering, P454 (1957), McGraw-Hill, USA].

Recently, development of hydrophobic, highly efficient catalysts for promoting isotope exchange reaction between water and hydrogen gas has progressed, and studies of separating and enriching hydrogen isotopes by dual temperature process between water and hydrogen gas have been extensively made [Canadian Pat. No. 907,292; U.S. Pat. No. 4,025,560; Canadian Journal of Chemistry 50 1900–1906 (1972)].

A flow diagram of the conventional dual temperature process between water and hydrogen gas is shown schematically in FIG. 1 [Benedict, Pigford: Nuclear Chemical Engineering, pp 455–357 (1957) McGraw-Hill, USA], wherein a cold reactor 1 and a hot reactor 2 are filled with hydrophobic catalyst, and countercurrent catalytic reaction takes place between water and hydrogen gas in the catalyst beds. The cold reactor 1 is usually operated at a temperature of 30° C. under one atmosphere, and deuterium is transferred from the hydrogen gas to water under the operating conditions, and heavy water is enriched. On the other hand, the hot reactor 2 is operated at a temperature of 250° C. under about 30 atmospheres. Deuterium is transferred from water to hydrogen gas under the operating conditions, and heavy water is depleted.

However, the reactors are filled with the hydrophobic catalyst in the conventional process, and consequently gas-liquid contact becomes very uneven in the catalyst beds, considerably lowering the reactor efficiency. Furthermore, the operating pressure in the hot reactor is high, and thus there is such a problem as an increased risk of radioactive contamination due to hydrogen gas leakage, particularly tritium leakage when tritium as a hydrogen isotope is handled.

To solve these problems, some of the present inventors made studies and found a process shown in FIG. 2 (U.S. patent application Ser. No. 190,173; Canadian Patent Application No. 360,703), where feed water is made in mists, and then water mists and hydrogen gas are subjected to cocurrent catalytic reaction in the catalyst bed in a cold reactor to make uniform gas-liquid contact and catalytic reaction proceed, and water is vaporized in a hot reactor, and the water vapor and hydrogen gas are subjected to gas-gas cocurrent contact and catalytic reaction therein to make uniform catalytic reaction proceed and also enable the hot reaction to proceed under the atmospheric pressure. However, according to the process, the operation is carried out cocurrently, and thus an operating line depending upon a given material balance and an equilibrium curve depending upon a given chemical equilibrium are crossed, and the multi-stage effect cannot be obtained. Thus, a large number of hot reactors are required for highly enriching the hydrogen isotopes. Each hot reactor 2 is provided with an evaporator 3 and a condenser 4, and thus evaporation and condensation of water are inevitably repeated before and after every hot reactor. Thus, the process shown in FIG. 2 requires a large number of hot reactors and consequently has such a problem that energy consumption will be increased.

SUMMARY OF THE INVENTION

An object of the present invention is to provide a process for separating and recovering hydrogen isotopes, which is free from the disadvantages as mentioned above, and can decrease energy consumption and can make the apparatus more compact.

The present invention provides a process for separating and recovering hydrogen isotopes by dual temperature process using a cold reactor and a hot reactor, which comprises:

(1) a first step of at least one stage, each comprising contacting mists of a feed liquid containing a hydrogen isotope species desired to recover together with a reacting gas cocurrently with an isotope exchange reaction catalyst at a low temperature, thereby carrying out an isotope exchange reaction between the mists and the reacting gas, separating the mist from the reacting gas, and recovering the mist as a liquid enriched in the desired hydrogen isotope species, and (2) a second step of a plurality of stages, each comprising contacting a portion of the liquid enriched in the desired hydrogen isotope species from the first step with vapor of the liquid and the reacting gas in a gas-liquid contact means, thereby carrying out an isotope exchange reaction between the liquid and the vapor of the liquid, while the vapor of the liquid and the reacting gas are contacted cocurrently with an isotope exchange reaction catalyst at a high temperature before the gas-liquid contact in the gas-liquid contact means, thereby carrying out isotope exchange reaction between the vapors of the liquid and the reacting gas, and introducing the liquid after the gas-liquid contact in the gas-liquid contact means into another gas-liquid means in another stage, thereby repeating the gas-liquid contact, while contacting the vapor of the liquid and the reacting gas after the gas-liquid contact in the gas-liquid contact means with an isotope exchange reaction catalyst in another stage, thereby repeating the isotope exchange reaction between the vapors of the liquid and the reacting gas.

According to the present invention, the liquid is principally light water or heavy water, the desired isotope species is principally deuterium or tritium, and the reacting gas is principally hydrogen gas or deuterium gas and is used by recycle between the first step and the second step in a closed system.

According to the present invention, the first step and the second step are operated under the atmospheric pressure, and the isotope exchange reaction in the second step is carried out at a higher temperature than the gas-liquid contact temperature in the gas-liquid contact means. The gas-liquid contact in the second step is carried out at a lower temperature than the boiling point of the liquid under the atmospheric pressure, and the isotope exchange reaction in the second step is carried out at a higher temperature than the boiling point of the liquid under the atmospheric pressure.

According to the present invention, the isotope exchange reaction in the first step is carried out at a temperature of 10°–80° C., preferably 20°–50° C., under the atmospheric pressure, and the gas-liquid contact in the second step is carried out at a temperature of 40°–90° C., preferably 60°–80° C., under the atmospheric pressure, and the isotope exchange reaction in the second step is carried out at a temperature of 150°–350° C., preferably 200°–250° C., under the atmospheric pressure.

According to the present invention, the vapor of the liquid and the reacting gas leaving the gas-liquid contact in the second step is heated to the above-mentioned predetermined temperature before the isotope exchange reaction. The isotope exchange reaction catalyst in the second step is externally heated to the above-mentioned predetermined temperature.

According to the present invention, bubble capped plates are preferable as the gas-liquid contact means in the second step.

The present invention will be described in detail referring to the accompanying drawings.

BRIEF DESCRIPTION OF THE DRAWINGS

FIGS. 1 and 2 are schematic diagrams showing the dual temperature processes so far proposed.

FIG. 3 is a schematic diagram showing one embodiment of the process according to the present invention.

PREFERRED EMBODIMENTS OF THE INVENTION

Figure 4:
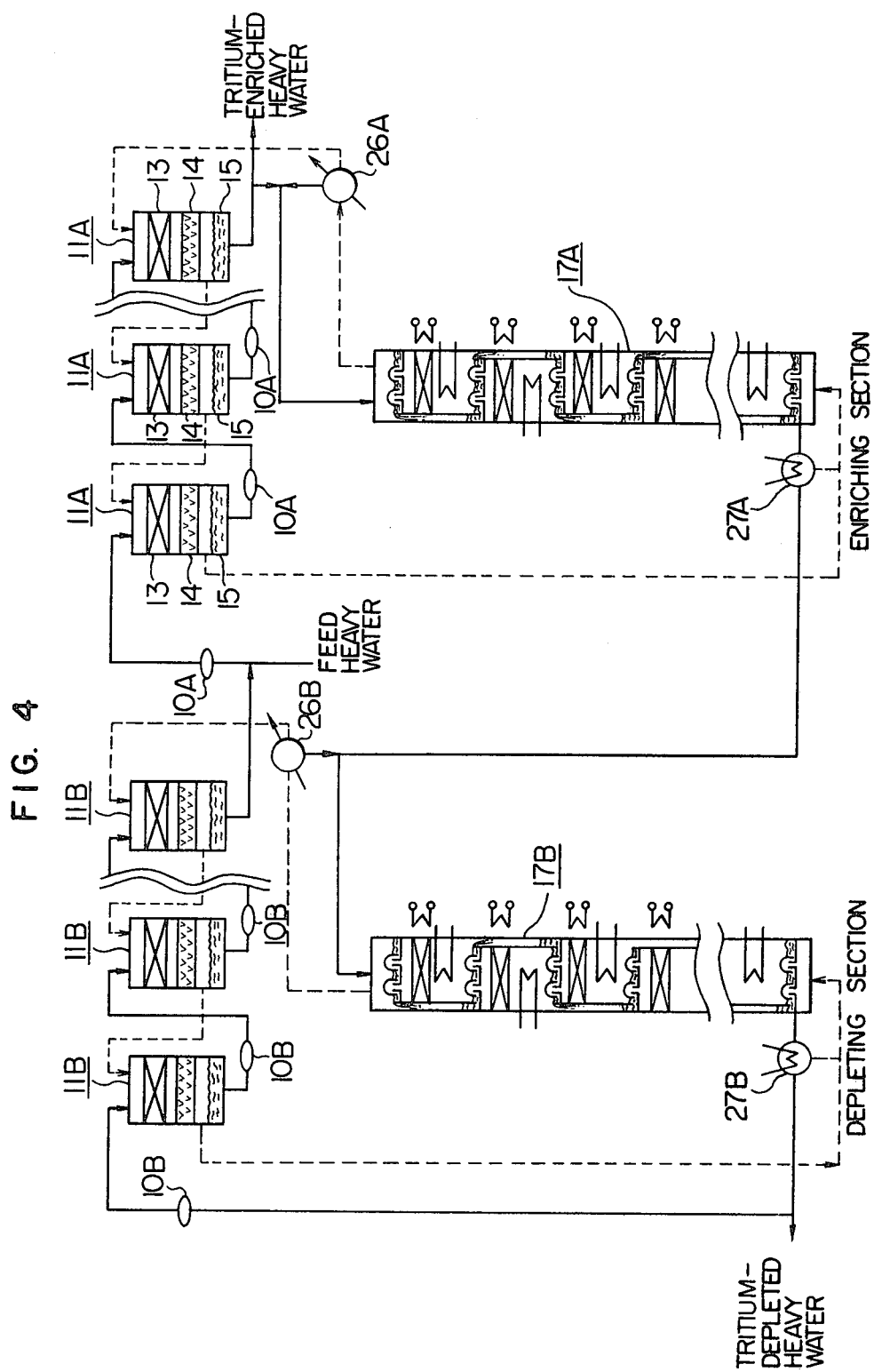
FIG. 4 is a schematic diagram showing an actual application of the present process to an apparatus for separating and removing tritium.

In FIG. 3, one embodiment of the basic structure of an apparatus for removing tritium by dual temperature process according to the present invention is shown.

Cold reactors 11 and 11' are comprised, each, of mist generators 10 and 10' at the inlets and outside of the cold reactors 11 and 11', and cold catalyst beds 13 and 13', mist separators 14 and 14' and liquid reservoirs 15 and 15' successively arranged from the top toward the bottom within the cold reactors, as units.

Hot reactor 17 is comprised of a bubble cap plate 21A at the top, and a first stage comprising a hot catalyst bed 18, a superheater 20 and a bubble cap plate 21 as a gas-liquid contact means arranged successively downwardly within the hot reactor, and a heater 19 at the outside of the hot catalyst bed 18, a second stage of a hot catalyst bed 18', a superheater 20', a bubble cap plate 21' arranged further successively downwardly and a heater 19' provided at the outside of the hot catalyst bed 18', and a plurality of further stages of the same structure as that of the first or second stage. Condenser 26 is connected to the top of the hot reactor 17 and vaporizer 27 to the bottom of the hot reactor 17.

Feed water containing about 0.1 ppm of tritium as the desired isotope species to be recovered is converted to fine water mists in a mist generator 10, and the resulting mists are supplied to the top of cold reactor 11. Tritium-enriched hydrogen gas is introduced as the reacting gas to the top of cold reactor 11 from the lower part of cold reactor 11'.

The cold reactor 11 is operated at a temperature of 10°–80° C., preferably 20°–50° C., under the atmospheric pressure. As the cold catalyst, hydrophobic catalyst of platinum supported on porous Teflon tubes is used. In the cold reactor 11, water mists and hydrogen gas are subjected to gas-liquid contact and catalytic reaction in the cold catalyst bed 13, where tritium is transferred from the hydrogen gas to water mists, and tritium is enriched in water.

The water mists and hydrogen gas leaving the gas-liquid contact and catalytic reaction are separated into water and hydrogen gas in the mist separator 14. The separated water is fed to the next cold reactor 11' as mists through the water reservoir 15 and mist generator 10'. The cold reactor 11' is operated under the same operating conditions as in the cold reactor 11. In the cold reactor 11', the mists come in contact with the hydrogen gas leaving the top of hot reactor 17, and the tritium in the mist is further enriched in the same manner as in the cold reactor 11, and the tritium-enriched water is withdrawn from the bottom of cold reactor 11'.

In the hot reactor 17, tritium is recovered from water as shown below:

As the hot catalyst used in the hot reactor 17, metallic catalyst of nickel-chromium sponge metal plated with palladium, or ceramic catalyst of platinum or nickel-chromia supported on alumina is used.

A portion of tritium-enriched water from the bottom of cold reactor 11' is fed onto a bubble cap plate 21A above the first stage. Temperature of the bubble cap plate 21A is 30°–80° C. Water on the bubble cap plate 21A contacts water vapor and hydrogen gas from the lower hot catalyst bed 18 to generate saturated water vapor. Isotope exchange reaction takes place between the water and water vapor, whereby tritium is transferred from the water to the water vapor. Consequently, the tritium concentration of the water is decreased. The water is supplied from the bubble cap plate 21A to the lower bubble cap plate 21 through a downcomer. At the bubble cap plate 21, the same reaction as above takes place through contact of the water with the water vapor and hydrogen gas from the second stage.

On the other hand, the water vapor from the bubble cap plates 21 and 21' is superheated to a temperature of 150°–350° C. in superheaters 20 and 20', and is led to the hot catalyst beds 18 and 18' together with hydrogen gas.

In the hot catalyst beds 18 and 18', cocurrent contact and catalytic reaction are carried out at 150°–350° C., preferably 200°–250° C., whereby tritium is transferred from the water vapor to the hydrogen gas. The water vapor from the hot catalyst beds 18 and 18' is passed through the bubble cap plate 18A and condensed in the condenser 26. The condensate is mixed into the effluent water from the bottom of the cold reactor 11'. The hydrogen gas is introduced into the top of the cold reactor 11' through the condenser 26. The hydrogen gas ascending through the hot reactor is the hydrogen gas from the cold reactor 11.

As described above, reaction of transferring tritium from the water to the hydrogen gas through the water vapor as a medium takes place at each stage in the hot reactor 17. As a result, the water flowing down from the top of hot reactor 17 is depleted of tritium toward the bottom of the hot reactor.

As is evident from FIG. 3, only one evaporator and one condenser are sufficient for the hot reactor 17, even if the contact and catalytic reaction are carried out repeatedly. On the other hand, in the case shown in FIG. 2, an evaporator and a condenser are required for each stage. Thus, the necessary energy consumption can be reduced in the present invention, as compared with the case as shown in FIG. 2.

An application of the present invention to an actual apparatus for removing and enriching tritium will be described below, where heavy water as the feed water is treated at a rate of 10 l/hr with a decontamination factor of 10 and an enriching factor of 10, as shown in FIG. 4. The operating conditions and specification of the apparatus for concentrating and depleting tritium are shown in the following table. Structures of cold reactors 11A and 11B and hot reactors 17A and 17B are the same as those of the cold reactors 11 and 11' and the hot reactor 17 shown in FIG. 3.

exchange reaction according to the following exchange reaction equation:

$$DTO+D_2\rightarrow D_2O+DT \quad (2)$$

At the outlet of hot reactor in the enriching section, depleted water having a tritium concentration of 0.86 ppm is obtained. Furthermore, in the hot reactor in the depleting section, the tritium concentration is lowered by exchange reaction according to the equation (2), and ultimately, a portion of depleted water having a tritium concentration of 0.1 ppm (decontamination factor: 10) is withdrawn at the outlet of the hot reactor in the depleting section. Remaining portion of the depleted heavy water is led to the cold reactors in the depleting section as recycle (flow rate: 50 l/hr), and the tritium concentration is enhanced to 1 ppm by the exchange reaction according to the equation (1), and then led to the cold reactors in the enriching section together with the feed water. The hydrogen gas is recyclically used between the cold reactors and the hot reactor, as is evident from the equations (1) and (2).

As is evident from the foregoing, high enriching and high depletion of tritium in heavy water can be attained by using dual temperature process reactors of FIG. 3 in the enriching section and depleting section.

In the foregoing embodiment, only two vaporizers 27A and 27B and only two condensers 26A and 26B are required. The heat requirement for vaporization and that for condensation under the conditions shown in the above table are found to be about 5 kW each upon calculation, whereas in the case shown in FIG. 2, 28 vaporizers and 28 condensers are required for the apparatus for enriching and depleting tritium with the same requirements, where the heat requirements for vaporization and condensation are about 100 kW each. Thus, in the present invention, the number of vaporizers and

|  |  | Cold reactor | | Hot reactor | |
|---|---|---|---|---|---|
|  |  | Enriching section | Depleting section | Enriching section | Depleting section |
| Operating conditions | Catalyst bed temperature (°C.) | 30 | 30 | 200 | 200 |
|  | Bubble cap plate temperature (°C.) | — | — | 80 | 80 |
|  | Gas linear velocity (m/sec) | 0.1 | 0.1 | 0.1 | 0.1 |
| Specification of apparatus | Number of reactors | 14 | 14 | 1 | 1 |
|  | Number of bubble cap plate | — | — | 14 | 14 |
|  | Reactor diameter (m) | 0.6 | 0.6 | 0.6 | 0.6 |
|  | Reactor height (m) | 0.5 | 0.5 | 6 | 6 |

Figure 5:
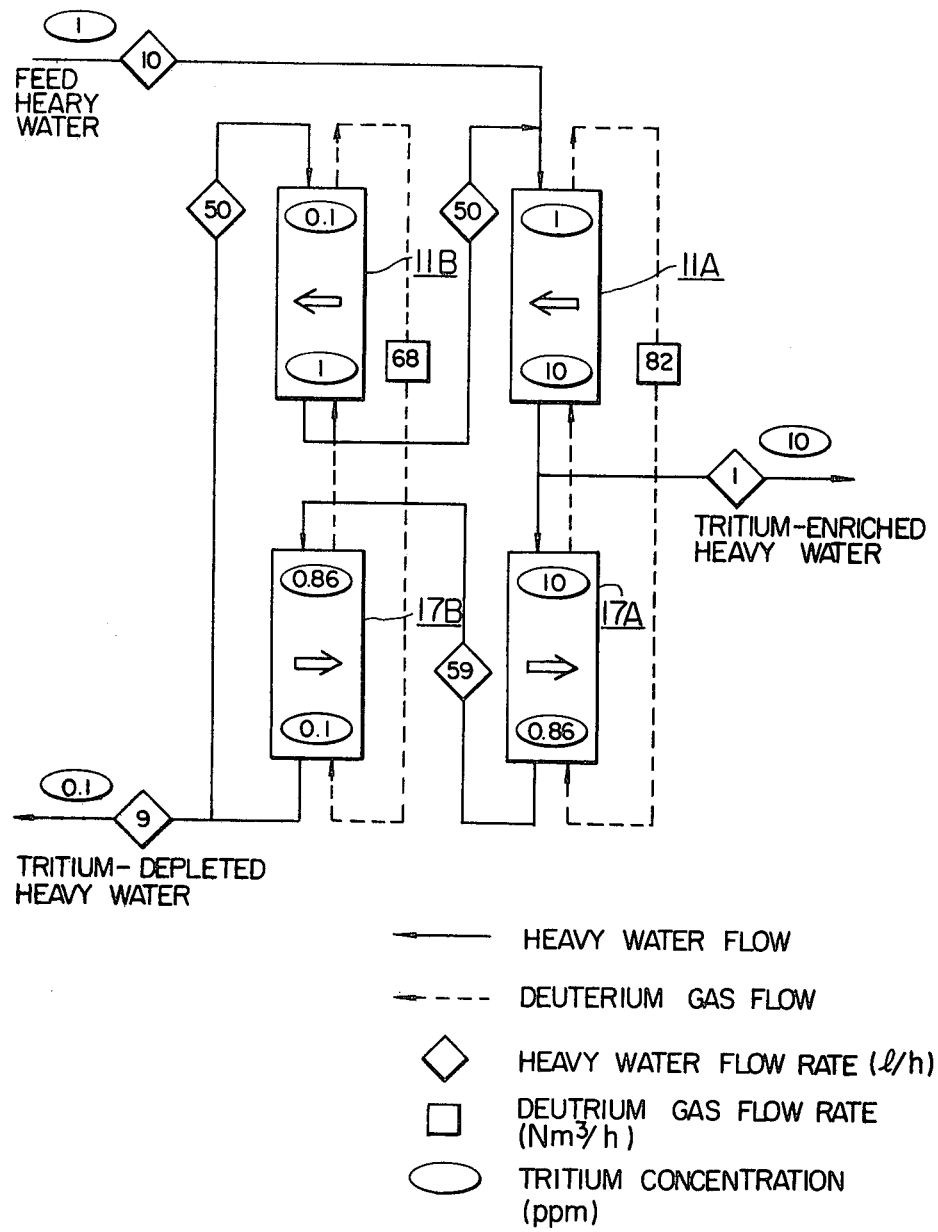
FIG. 5 is a flow diagram showing the balance of the apparatus given in FIG. 4.

FIG. 5 is the flow diagram showing the material balance of an apparatus for enriching and depleting tritium of FIG. 4 when heavy water having a tritium concentration of 1 ppm is used as feed water. That is, tritium in the heavy water as the feed water is enriched in each of the cold reactors by hydrogen isotope exchange reaction between water and hydrogen gas according to the following exchange reaction equation:

$$DTO+DT\rightarrow T_2O+D_2 \quad (1)$$

A portion of the tritium-enriched heavy water is withdrawn at a tritium concentration of 10 ppm (enriching factor: 10). On the other hand, in hot reactors, the tritium concentration of heavy water is lowered by the condensers is one-fifth that of the case shown in FIG. 2, and the energy consumption and equipment cost can be reduced. At the same time, the apparatus can be made compact.

In the foregoing embodiment, the process for enriching and depleting tritium in heavy water has been described, but the present invention can be applied, as it is, to depletion of tritium from light water or enriching of deuterium in light water. In these cases, equivalent concentration or depletion can be attained with about one-half of the number of cold reactor and number of stages in the hot reactors of the apparatus for enriching and depleting tritium from heavy water.

According to the present invention, the energy consumption can be effectively reduced, and the apparatus can be effectively made compact.

What is claimed is:

1. A process for separating and recovering hydrogen isotopes by a dual temperature process using a cool reactor and a hot reactor, which comprises:
   (1) a first step of at least one stage, each comprising contacting mists of a feed liquid containing a hydrogen isotope species desired to be recovered together with a first reacting gas cocurrently with an isotope exchange reaction catalyst at a low temperature, thereby carrying out an isotope exchange reaction between the mists and the first reacting gas, separating the mist from the first reacting gas, and recovering the mist as a liquid enriched in the desired hydrogen isotope species, and
   (2) a second step of a plurality of stages, each comprising contacting a portion of the liquid enriched in the desired hydrogen isotope species from the first step with a first vapor of the liquid and a second reacting gas in a gas-liquid contact means, thereby carrying out an isotope exchange reaction between the liquid and the first vapor of the liquid, while a second vapor of the liquid and a third reacting gas are contacted cocurrently with an isotope exchange reaction catalyst at a high temperature before the gas-liquid contact in the gas-liquid contact means, thereby carrying out isotope exchange reaction between the vapors of the liquid and the third reacting gas, and introducing the liquid after the gas-liquid contact in the gas-liquid contact means into another gas-liquid means in another stage, thereby repeating the gas-liquid contact, while contacting the vapor of the liquid and another reacting gas before the gas-liquid contact in the gas-liquid contact means with an isotope exchange reaction catalyst in another stage, thereby repeating the isotope exchange reaction between the vapors of the liquid and the another reacting gas.

2. A process according to claim 1, wherein the reacting gas is recycled between the first step and the second step.

3. A process according to claim 1, wherein the isotope exchange reaction between the vapor of the liquid and the reacting gas in the second step is carried out at a higher temperature than the temperature of the gas-liquid contact in the gas-liquid contact means.

4. A process according to claim 1, wherein the first step and the second step are carried out under the atmospheric pressure.

5. A process according to claim 4, wherein the gas-liquid contact in the second step is carried out at a temperature below the boiling point of the liquid under the atmospheric pressure.

6. A process according to claim 5, wherein the isotope exchange reaction is carried out at a temperature higher than the boiling point of the liquid under the atmospheric pressure.

7. A process according to claim 1, wherein the liquid is light water or heavy water, the desired isotope species is deuterium or tritium, and the first, second, third and another reacting gases are hydrogen respectively having different concentrations of the hydrogen isotope species.

8. A process according to claim 7, wherein the isotope exchange reaction in the first step is carried out at 10°–80° C. under the atmospheric pressure, and the gas-liquid contact and the isotope exchange reaction in the second step are carried out at 40°–90° C. and 150°–350° C., respectively, under the atmospheric pressure.

9. A process according to claim 1, wherein the vapor of the liquid and the reacting gas are heated before the isotope exchange reaction and after the gas-liquid contact in the second step.

10. A process according to claim 1, wherein the isotope exchange reaction catalyst is externally heated.

11. A process according to claim 1, wherein the gas-liquid contact means is bubble-capped plate.

12. A process according to claim 1, wherein the first reacting gas is hydrogen gas having a higher concentration of the hydrogen isotope than the hydrogen isotope concentration of the reacting gas in an isotope equilibrium with the feed liquid, the second reacting gas is in an isotope equilibrium with the vapor of the liquid and the third reacting gas has a lower concentration of the hydrogen isotope than the hydrogen isotope concentration of the reacting gas in an isotope equilibrium with the vapor of the liquid and the first vapor of the liquid is in isotope equilibrium with the second reacting gas while the second vapor of the liquid is in isotope equilibrium with the liquid in a one-stage lower gas-liquid contact means.

* * * * *